H. C. ALGER.
LIQUID METER.
APPLICATION FILED FEB. 10, 1908.

1,000,973.

Patented Aug. 22, 1911.

WITNESSES:
Raymond Meader
Arthur E. Vosburg

INVENTOR
Harley C. Alger

UNITED STATES PATENT OFFICE.

HARLEY CLIFFORD ALGER, OF CHICAGO HEIGHTS, ILLINOIS.

LIQUID-METER.

1,000,973.   Specification of Letters Patent.   Patented Aug. 22, 1911.

Application filed February 10, 1908. Serial No. 415,091.

*To all whom it may concern:*

Be it known that I, HARLEY CLIFFORD ALGER, a citizen of the United States, residing at Chicago Heights, in the county of Cook and State of Illinois, have invented a new and useful Improvement in Liquid-Meters, of which the following is a complete specification.

My invention relates to improvements in liquid meters in which receptacles or chambers are automatically and successively filled and emptied, one object being to provide a meter which shall receive liquid in a continuous or in a varying stream, and deliver it in unit charges of predetermined and unvarying weight or volume.

Another object is to provide a meter which will receive liquid in a continuous stream and deliver it in unvarying unit charges without interrupting the flow of the entering liquid.

A still further object is the provision of a device of this character capable of receiving and delivering liquid without the employment of valves or equivalent devices.

Figure 4:
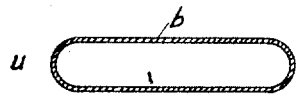
Figure 3:
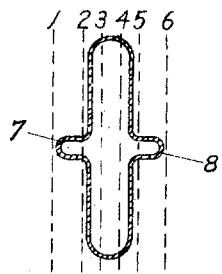
Figure 2:
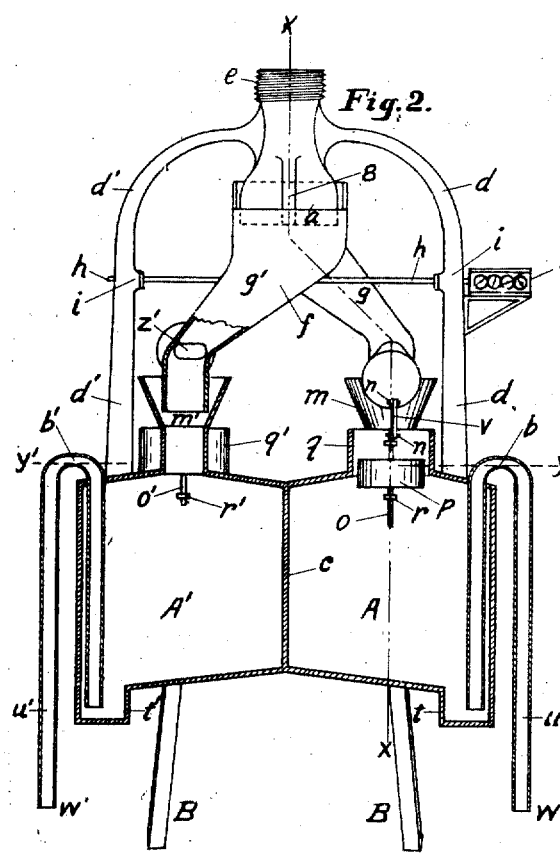
Figure 1:
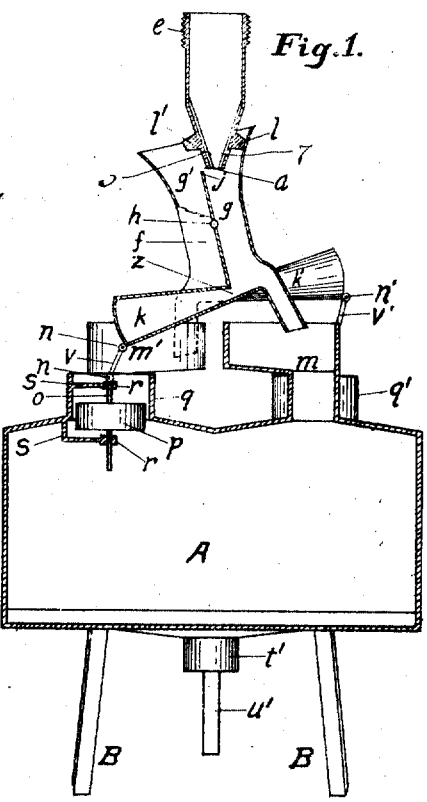

In the accompanying drawing, Figure 1 is a vertical view of a meter partly in section on the line X—X of Fig. 2; Fig. 2 is a vertical view of the meter partly in section taken at right angles to Fig. 1; Fig. 3 is a view in cross section of the lower end of the inlet nozzle, and Fig. 4 is a cross sectional view through one of the bends in the siphon pipes as at $b$ Fig. 2.

Referring to the accompanying drawing, the meter comprises two closed measuring compartments A and A', Fig. 2, placed side by side, the compartments separated from each other by the wall or partition $c$. These compartments form the body of the meter. They are supported by the legs B B.

An inlet nozzle, $a$, supported above the compartments by the arms $d$ $d'$ is provided with a suitable connection as at $e$ for a hose or pipe, (not shown) adapted to supply liquid to the meter. A tipping member $f$ is located beneath the inlet nozzle. Such member consists of divergent passages $g$ and $g'$ separated by the dividing diaphragm $j$ which swings under the lower end, $a$, of the inlet nozzle. The member is rigidly mounted on the rod, $h$, which rod is journaled in bearings $i$, $i$, in the arms $d$ and $d'$.

The passages $g$ and $g'$ in the tipping member $f$, are provided with laterally extending pockets $k$ and $k'$ respectively, which may be conical in shape. The center of gravity of the tipping member is above bearings $i$ $i$, so that when the member is tipped a slight distance past the vertical center line, it will fall by gravity until its upper edge strikes a lug $l$ on the inlet nozzle, and there remain until rocked back a slight distance past the center when it will swing in the opposite direction until its upper edge strikes the lug $l'$ on the opposite side of the inlet nozzle. The use of the lugs is optional. The lower ends of the passages $g$ and $g'$ of the tipping member are adapted to discharge liquid into the hoppers $m$ and $m'$ communicating with the compartments A and A' respectively.

The rods $o$ and $o'$ are loosely connected to the tipping member in any suitable manner, as by the links $v$ and $v'$ pivotally secured to the rods and to the tipping member by means of pin joints at $n$ $n$ and $n'$ Figs. 1 and 2. The rods O and O' are received in necks $q$ and $q'$ communicating with the respective measuring compartments, and carry light metal or cork floats which are suspended in the measuring compartments A and A' respectively. The float $p$, suspended in compartment A, is clearly shown in Figs. 1 and 2. These floats are free to move in the necks $q$ and $q'$, being guided in their movement by the rods $o$ and $o'$ which slide in eyes $r$ $r$ and $r'$. The eyes $r$ and $r'$ are supported in any suitable manner as shown at S, Fig. 1.

The bottoms of the measuring compartments A and A' are preferably inclined and terminate in the wells $t$, $t'$. In order to discharge the contents of the respective compartments I preferably employ the bent siphon pipes $u$ and $u'$. These pipes extend from points near the bottoms of the wells $t$ $t'$ up through the tops of the measuring compartments and return outside the measuring compartments to points $w$ and $w'$ below the bottom of the wells as shown in Fig. 2. These tubes act as siphons to draw all of the liquid from the compartments A and A'.

The meter operates as follows: Liquid enters the inlet nozzle by means of any suitable connection secured thereto at $e$, and is discharged into the passage $g$ or $g'$. Assume that the inlet nozzle is discharging into the passage $g$. After filling the pocket $k$ carried by the tipping member and communicating with the passage $g$ through the opening $z$, the liquid is delivered into the hopper $m$ and is led to the measuring compartment A. The compartment A will be gradually filled with the liquid. The float $p$ is so adjusted that when the measuring compartment A is full and the liquid reaches the height $y$ in the siphon pipe $u$ above the top of the measuring compartment, it will raise the float $p$ which pushes up on the rod $o$, and thereby throw the center of gravity of the tipping member over a little distance past the center line. The tipping member will then fall by gravity until its upper end strikes the lug $l'$ on the inlet nozzle, and the liquid discharged from the nozzle will then flow into the passage $g'$ because the diaphragm $j$ has been moved to the opposite side of the nozzle. After filling the pocket $k'$, the liquid will pass through the hopper $m'$ into the measuring compartment A'. At the same time that the tilting of the tipping member operates to elevate the pocket $k$ which is full of liquid, the liquid contained therein is suddenly thrown into the measuring compartment A, the contents of which are already on the point of spilling through the siphon pipe $u$ at its upper bend $b$. The sudden increase in head caused by this extra liquid previously stored in the pocket $k$, immediately starts the siphon, which will continue until the measuring compartment A has been completely emptied. Meanwhile the liquid is flowing into the measuring compartment A' after filling the pocket $k'$ and when the liquid reaches the level $y'$, the tipping device will be thrown back to its former position (shown in Fig. 1) by a similar operation of the float in the measuring compartment A'; the siphon $u'$ will be started by the liquid in pocket $k'$; and the stream will be again directed into the measuring compartment A which has been completely emptied of its liquid, while the measuring compartment A' was filling. Practically the same amount of liquid will have passed through the meter during each complete cycle, or each time the two compartments are emptied, or if compartments A and A' are of exactly the same capacity, the same amount of liquid will have passed through the meter each time a siphon operates. A registering device C may be connected to the rod $h\ h$ and so arranged as to register the number of cubic feet or pounds which have passed through the meter.

Ordinarily during the interval that the supply was being directed from one measuring compartment to the other by the tipping member, more liquid would pass to the measuring compartment that was being filled when the liquid was flowing swiftly and in a solid stream from the inlet nozzle $a$, than when the supply was less and a mere trickle of liquid was flowing. Such a condition would give rise to an error because more liquid would be discharged each time a siphon operated when the supply was rapid than when the supply was slow. To remove this objection, I have provided the lower end of the inlet nozzle $a$ with the shape shown in Fig. 3. For instance the cross sectional area of the discharge end of the nozzle is elongated and provided with hollow noses projecting from the opposite side walls of the nozzle, the noses being in communication with the interior of the nozzle. As the dividing diaphragm $j$ of the tipping member, $f$, passes the lower end of the inlet nozzle $a$ from left to right, it will pass through the positions shown by the dotted lines 1—1, 2—2, 3—3, 4—4, 5—5 and 6, 6. When the said diaphragm is in position 1, 1 all of the liquid flowing will flow to the passage $g$, but when said diaphragm is in position 5, 5 only a small stream of liquid will flow to passage $g$. The float $p$ may be so adjusted that just before the liquid reaches the level $y$, the tipping member will be thrown over so that the said diaphragm $j$ will be in the position 5, 5. The center of gravity of the tipping member is now a very slight distance past the vertical center line, but not far enough past to overcome the friction of the bearings $l\ l$. Only a small stream of liquid will now be flowing to passage $g$, and when a few seconds later the liquid reaches the level $y$, only a small stream remains to be intercepted and directed into the opposite compartment A A'. Under these conditions only a small stream of liquid is finally cut off in each case whether the liquid is flowing rapidly or slowly through the inlet nozzle $a$, and the error arising therefrom is reduced to a minimum.

I have provided the bends in the siphon pipes $u$ and $u'$ with elongated sections (having the same area as the rest of the siphon pipe) their narrow dimensions being vertical as shown at $b$ and $b'$ Figs. 2 and 4. This enables the siphons to be started by a much smaller increase in head, thus reducing the amount of water to be carried in the pockets $k$ and $k'$ used to start the siphons.

The pockets $k$ and $k'$ are preferably made conical with contracted necks at the ends where they join the passages $g$ and $g'$ respectively, as shown at $z$ Fig. 1 and $z'$ Fig. 2, so that, when full, the amount of liquid in each pocket will be very nearly the same even though the level of the liquid in the pocket may be higher at one time than another as might be the case if the meter were jarred or tipped more or less. The error due to different heights of liquid in this small contracted neck is thus made negligible.

The tops of the measuring compartments are made with a gradual rise from the sides toward the necks $q$ and $q'$ and toward the hoppers $m$ and $m'$, so that the air is given full opportunity to escape, and also in order to prevent air from being entrained in the measuring compartments.

The level of the liquid is brought up to the points $y$ and $y'$, well above the tops of the measuring compartments before the tipping device is allowed to operate in order to insure the complete filling of the measuring compartments, and also that the error due to differences in the height of the level of the liquid at the time the siphon starts may be made negligible because such variation will then take place over the small areas of the hoppers $m$ and $m'$ and the necks $q$ and $q'$ instead of over the entire areas of the respective measuring compartments.

The bottom of each of the measuring compartments A and A' slopes gradually downward toward the small wells $t$ and $t'$ respectively, in which the short ends of the siphon pipes are inserted. This insures an almost complete emptying of each measuring compartment, the only liquid left being the very small amount below the short end of the siphon pipe. It also increases the accuracy of the meter because any variation in the level of liquid at the time the siphon stops running will take place over the small area of the wells $t$ and $t'$, and any error arising therefrom will not be appreciable.

What I claim as my invention and desire to secure by Letters Patent is as follows:

1. In a metering device comprising measuring compartments, dividing means separating the measuring compartments and a tilting member affording passage for the material being measured and for directing the same to the measuring compartments, such tilting member adapted to swing about an axis substantially normal to the dividing means.

2. The combination in a meter comprising a measuring compartment, of a discharge siphon leading therefrom, means for storing liquid, means for delivering liquid to the measuring compartment and to the storing means and means controlled by the liquid in the measuring compartment for automatically discharging the stored liquid to the measuring compartment to start the siphon.

3. A meter comprising measuring compartments, means for supplying and means for intercepting the supply of the liquid thereto, siphons for discharging the contents of the measuring compartments, receptacles in communication with the supply by means of the intercepting means and means controlled by the liquid in the measuring compartments for emptying the liquid caught in the receptacles into the measuring compartments at the proper time to start the siphons.

4. The combination with a meter comprising a plurality of measuring compartments, of siphons for discharging the contents of the measuring compartments, a movable member, means for supplying liquid thereto, such movable member being adapted to deliver liquid to the respective measuring compartments successively, receptacles attached to the movable member, having necks in the path of the liquid supplied and means controlled by the liquid in the measuring compartments for inclining the movable member to cause the discharge of the liquid caught in the receptacles into their respective measuring compartments at the proper time to start the siphons.

5. The combination in a meter comprising measuring compartments, of means for discharging the contents of the measuring compartments, receptacles adapted to receive a portion of the entering liquid, means for supplying liquid to the receptacles and to the measuring compartments and means controlled by the liquid in the measuring compartments for discharging the liquid caught in the receptacles into the measuring compartment to cause the discharging means to automatically commence to operate.

6. The combination in a meter comprising a measuring compartment, of means for supplying liquid thereto, means for intercepting the supply, a siphon for discharging the contents of the measuring compartment, a receptacle adapted to receive liquid from the intercepting means, such receptacle having a contracted neck in the path of the entering liquid and means controlled by the liquid in the measuring compartment for decanting the liquid caught in the receptacle into the measuring compartment at the proper time to start the siphon.

7. The combination in a meter comprising a plurality of measuring compartments, of means for draining the compartments, a movable member comprising two channels adapted to deliver liquid to the respective measuring compartments, floats suspended in the liquid in the measuring compartments, means connecting the floats to the movable member and means for discharging liquid into the movable member.

8. The combination with a tank, of a discharge siphon leading therefrom, the discharge siphon being flattened at its bend, forming an elongated section, with the upright dimension less than the normal diameter of the siphon, means for supplying liquid to the tank, means for storing a portion of the liquid supplied and means controlled by the liquid in the tank for discharging the stored liquid into the tank at the proper time to start the siphon.

9. The combination with a meter comprising a measuring compartment, of a discharge siphon leading therefrom, means for supplying liquid to the measuring compartment, means for storing a portion of the liquid supplied and means controlled by the liquid being measured for discharging the stored liquid into the measuring compartment at the proper time to start the siphon.

10. The combination in a meter comprising a measuring compartment, of means for supplying liquid thereto, a receptacle in communication with the path of the liquid supplied to the measuring compartment, a siphon for discharging the contents of the measuring compartment, such siphon having a bend, the bend having an elongated flattened section, the narrow dimension of which is upright and less than the normal diameter of the siphon and means controlled by the liquid being measured for decanting the liquid caught in the receptacle into the measuring compartment at the proper time to start the siphon.

11. The combination in a meter comprising a plurality of measuring compartments, of a movable member for directing liquid thereto, means controlled by the liquid being measured for moving the movable member, siphons for discharging the contents of the measuring compartments and receptacles attached to the movable member and adapted to be moved into the path of the liquid supplied to the measuring compartments, such receptacles adapted to be inclined by the movable member to cause the discharge of the liquid caught in the receptacles into their respective measuring compartments at the proper time to start the siphons.

12. A metering device comprising two measuring compartments, a partition separating the measuring compartments and a tipping member affording passage for the material being measured to the measuring compartment, such tipping member adapted to swing about an axis perpendicular to the partition.

13. The combination in a meter of a measuring compartment having an opening in its top, means for supplying liquid thereto, the top of the measuring compartment sloping from the opening toward the sides of the measuring compartment, a well formed in the bottom of the compartment, the bottom sloping from the sides of the measuring compartment toward the well, a siphon having an elongated flattened cross-section at the bend in said siphon with its narrow dimension upright and less than the normal diameter of the siphon, the shorter leg of such siphon communicating with the well and adapted to drain the measuring compartment from the well.

14. A metering device comprising measuring compartments, dividing means separating the measuring compartments, a tilting member affording passage for material being measured to the measuring compartments, such tilting member adapted to swing about an axis perpendicular to the dividing means and means controlled by the liquid in the measuring compartments for swinging the tilting member.

15. The combination with a tank, of means for supplying liquid thereto, a siphon for discharging the contents of the tank, such siphon having an elongated flattened section at its bend with its narrow dimension upright and less than the normal diameter of the siphon, a receptacle adapted to receive a portion of the liquid supplied and means controlled by the liquid in the tank for discharging the contents of the receptacle into the tank to start the siphon.

16. The combination with a tank, of means for supplying liquid thereto, means for storing a portion of the liquid supplied, a siphon for discharging the contents of such tank and means controlled by the liquid in the tank for automatically decanting the previously stored liquid into the tank at the proper time to start the siphon.

17. The combination in a meter comprising a measuring compartment, of discharging means leading therefrom, a receptacle adapted to store a portion of the liquid supplied, means for supplying liquid to the measuring compartment and to the storing means and means controlled by the liquid being measured for discharging the contents of the receptacle to start the operation of the discharging means.

18. The combination with a tank, of a siphon having an elongated flattened cross section at its bend, with its narrow dimension upright and less than the normal diameter of the siphon, such siphon being adapted to discharge the contents of the tank, a receptacle adapted to store a portion of the liquid supplied, means for supplying liquid to the receptacle and to the tank and means controlled by the liquid in the tank for discharging the contents of the receptacle into the tank to start the siphon.

19. A meter comprising a measuring compartment, discharging means adapted to lead liquid therefrom, a receptacle adapted to receive a portion of the liquid supplied, means for supplying the liquid to the measuring compartment and to the receptacle and means controlled by the liquid being measured for discharging liquid from the receptacle into the compartment to cause the discharging means to commence its operation.

20. A meter comprising a measuring compartment, discharging means for leading liquid therefrom, a receptacle adapted to be supplied with liquid, means for supplying liquid to the measuring compartment and to the receptacle and means controlled by the liquid being measured for emptying liquid from the receptacle into the measuring compartment to cause the discharging means to commence its operation.

21. A metering device consisting of two compartments, a tipping member divided into two channels which discharge into the respective compartments, a conduit adapted to discharge liquid into the tipping member, hollow noses on the discharge end of the conduit and means controlled by the liquid in the compartments for tilting the member when one of the compartments is nearly full, to divert the greater portion of liquid from one channel into the other and permit only the liquid issuing from one nose to complete the filling of the compartment.

22. A metering device having a siphon leading therefrom, means whereby a portion of the supply is stored, means for supplying liquid to the meter and to the storing means and means controlled by the liquid being measured for discharging the stored liquid to start the siphon.

23. A metering device comprising two measuring compartments, a partition separating such measuring compartments, a tipping member having two channels affording passage of liquid to the measuring compartments, such tipping member to swing about an axis perpendicular to the partition and means controlled by the liquid in the measuring compartments for swinging the tipping member.

24. A metering device comprising two measuring compartments, a partition separating such measuring compartments, a tipping member having two channels, such tipping member to swing about an axis perpendicular to the partition, such channels to lead to the respective measuring compartments and means controlled by the liquid in the measuring compartments for swinging the tipping member.

25. A metering device comprising two measuring compartments, dividing means separating the measuring compartments, a tipping member having two channels affording passage for liquid to the measuring compartments, such tipping member to swing about an axis which is perpendicular to the dividing means, and means controlled by the liquid in the measuring compartments for swinging the tipping member.

26. A metering device comprising two measuring compartments, dividing means separating the measuring compartments, a tipping member having two channels, such tipping member to swing about an axis which is perpendicular to the dividing means, such channels to lead to the respective measuring compartments and means controlled by the liquid in the measuring compartments for swinging the tipping member.

27. In a metering device comprising a measuring compartment, a conduit for supplying liquid thereto, said conduit having its cross sectional area elongated, a hollow nose in communication with the conduit and means for intercepting the liquid issuing from the elongated section and to cut off the liquid issuing from the hollow nose when the measuring compartment has received the proper amount of liquid.

28. A meter comprising a measuring compartment, discharging means leading therefrom, a receptacle adapted to receive liquid, means for supplying liquid to the measuring compartment and into the receptacle and means controlled by the liquid in the measuring compartment for emptying the liquid from the receptacle into the measuring compartment to cause the discharging means to commence its operation.

29. The combination in a measuring device comprising measuring compartments, of a movable member comprising channels adapted to direct liquid to the respective measuring compartments, floats controlled by the level of liquid in such compartments and means connecting the respective floats to the movable member to actuate the member in one direction or the other.

30. The combination in a measuring device comprising a measuring compartment, of discharge means leading therefrom, a receptacle adapted to receive liquid supplied, means for supplying liquid to the measuring compartment and to the receptacle, and means controlled by the liquid being measured for discharging the contents of the receptacle into the measuring compartment to start the operation of the discharging means.

31. The combination in a measuring device comprising a measuring compartment, of a conduit for supplying liquid, such conduit having hollow noses in connection therewith and projecting from either side of the conduit, a movable member adapted to receive the liquid issuing from the conduit and direct it to the measuring compartment, and means controlled by the liquid in the measuring compartment for moving the movable member.

32. The combination with a tank, of means for discharging liquid therefrom, means for storing a portion of the liquid supplied, means for supplying liquid to the tank and to the storing means and means controlled by the liquid in the tank for emptying the previously stored liquid into the tank to cause the discharging means to commence its operation.

33. In a meter comprising a measuring compartment, means for supplying liquid thereto, discharging means therefor, a receptacle so situated as to receive a part of the entering liquid, allowing passage of the remaining liquid to the measuring compartment and means controlled by the liquid in the measuring compartment for emptying the received liquid into the measuring compartment to cause the discharging means to commence its operation.

HARLEY CLIFFORD ALGER.

Witnesses:
 SQUIRE M. MEADER,
 RAYMOND MEADER.